United States Patent
Gruenstein et al.

(10) Patent No.: US 8,868,428 B2
(45) Date of Patent: *Oct. 21, 2014

(54) INTEGRATION OF EMBEDDED AND NETWORK SPEECH RECOGNIZERS

(75) Inventors: Alexander Gruenstein, Mountain View, CA (US); William J. Byrne, Davis, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,280

(22) Filed: Aug. 14, 2012

(65) Prior Publication Data

US 2012/0310645 A1 Dec. 6, 2012

Related U.S. Application Data

(63) Continuation of application No. 12/794,896, filed on Jun. 7, 2010.

(60) Provisional application No. 61/298,251, filed on Jan. 26, 2010.

(51) Int. Cl.

| | |
|---|---|
| *G10L 21/00* | (2013.01) |
| *G10L 15/30* | (2013.01) |
| *G10L 15/32* | (2013.01) |
| G10L 15/00 | (2013.01) |
| G06F 3/048 | (2013.01) |
| G06F 13/00 | (2006.01) |
| H04N 5/765 | (2006.01) |
| G06F 17/00 | (2006.01) |
| G06F 15/16 | (2006.01) |
| G06F 15/173 | (2006.01) |

(52) U.S. Cl.
CPC .................. *G10L 15/32* (2013.01); *G10L 15/30* (2013.01)
USPC ........... 704/275; 704/257; 704/231; 704/260; 704/235; 704/270; 386/231; 725/39; 715/800; 715/201; 709/223; 709/224; 709/225; 709/226; 709/229

(58) Field of Classification Search
USPC ......... 704/275, 257, 254, 231, 270, 251, 236, 704/260, 235, 10; 725/39; 386/231; 715/800; 709/223–229
See application file for complete search history.

(56) References Cited

U.S. PATENT DOCUMENTS 6,185,535 B1 * 2/2001 Hedin et al. .................. 704/270
6,363,488 B1   3/2002 Ginter et al.
(Continued)

FOREIGN PATENT DOCUMENTS

| CN | 100433840 C | 11/2008 |
|---|---|---|
| CN | 101611403 A | 12/2009 |
| EP | 1136983 A1 | 9/2001 |

OTHER PUBLICATIONS

Coyner et al., 'Distributed Speech Recognition Services,' International Symposium on Multimedia Software Engineering, 2000, pp. 59-66.

(Continued)

*Primary Examiner* — Paras D Shah
*Assistant Examiner* — Neeraj Sharma
(74) *Attorney, Agent, or Firm* — Fish & Richardson P.C.

(57) ABSTRACT

A method, computer program product, and system are provided for performing a voice command on a client device. The method can include translating, using a first speech recognizer located on the client device, an audio stream of a voice command to a first machine-readable voice command and generating a first query result using the first machine-readable voice command to query a client database. In addition, the audio stream can be transmitted to a remote server device that translates the audio stream to a second machine-readable voice command using a second speech recognizer. Further, the method can include receiving a second query result from the remote server device, where the second query result is generated by the remote server device using the second machine-readable voice command and displaying the first query result and the second query result on the client device.

12 Claims, 11 Drawing Sheets

(56) References Cited

U.S. PATENT DOCUMENTS

| | | | |
|---|---|---|---|
| 6,738,743 B2* | 5/2004 | Sharma et al. | 704/270.1 |
| 6,898,567 B2* | 5/2005 | Balasuriya | 704/231 |
| 6,963,759 B1 | 11/2005 | Gerson | |
| 6,993,482 B2* | 1/2006 | Ahlenius | 704/235 |
| 7,013,289 B2 | 3/2006 | Horn et al. | |
| 7,027,987 B1 | 4/2006 | Franz et al. | |
| 7,058,580 B2* | 6/2006 | Ueyama et al. | 704/270.1 |
| 7,062,444 B2* | 6/2006 | He et al. | 704/275 |
| 7,136,710 B1 | 11/2006 | Hoffberg et al. | |
| 7,191,135 B2* | 3/2007 | O'Hagan | 704/270.1 |
| 7,225,134 B2 | 5/2007 | Kamiya | |
| 7,461,352 B2* | 12/2008 | Katsuranis | 715/800 |
| 7,519,536 B2 | 4/2009 | Maes et al. | |
| 7,548,977 B2* | 6/2009 | Agapi et al. | 709/226 |
| 7,738,778 B2* | 6/2010 | Agnihotri et al. | 386/231 |
| 7,809,574 B2 | 10/2010 | Roth et al. | |
| 7,933,777 B2* | 4/2011 | Koll | 704/270.1 |
| 8,099,289 B2* | 1/2012 | Mozer et al. | 704/275 |
| 8,165,883 B2* | 4/2012 | Galanes et al. | 704/270 |
| 8,224,644 B2* | 7/2012 | Krumel et al. | 704/236 |
| 8,249,878 B2 | 8/2012 | Carraux et al. | |
| 8,504,372 B2* | 8/2013 | Carraux et al. | 704/270.1 |
| 2003/0139924 A1 | 7/2003 | Balasuriya | |
| 2004/0192384 A1 | 9/2004 | Anastasakos et al. | |
| 2004/0254787 A1* | 12/2004 | Shah et al. | 704/219 |
| 2005/0149500 A1 | 7/2005 | Marmaros et al. | |
| 2006/0235684 A1 | 10/2006 | Chang | |
| 2007/0061335 A1 | 3/2007 | Ramer et al. | |
| 2008/0071763 A1 | 3/2008 | Ferrenq et al. | |
| 2008/0154612 A1 | 6/2008 | Evermann et al. | |
| 2008/0162472 A1 | 7/2008 | Cheng et al. | |
| 2008/0221898 A1 | 9/2008 | Cerra et al. | |
| 2009/0106603 A1 | 4/2009 | Dilman et al. | |
| 2009/0144632 A1 | 6/2009 | Mendez | |
| 2009/0164216 A1 | 6/2009 | Chengalvarayan et al. | |
| 2009/0204409 A1 | 8/2009 | Mozer et al. | |
| 2009/0265163 A1* | 10/2009 | Li et al. | 704/10 |
| 2009/0271200 A1* | 10/2009 | Mishra et al. | 704/254 |
| 2010/0097239 A1 | 4/2010 | Campbell et al. | |
| 2010/0106497 A1* | 4/2010 | Phillips | 704/231 |
| 2010/0185448 A1 | 7/2010 | Meisel | |
| 2010/0312555 A1* | 12/2010 | Plumpe et al. | 704/231 |
| 2010/0312563 A1* | 12/2010 | Zhao et al. | 704/260 |
| 2011/0015928 A1* | 1/2011 | Odell et al. | 704/257 |
| 2011/0046951 A1* | 2/2011 | Suendermann et al. | 704/236 |
| 2011/0067059 A1* | 3/2011 | Johnston et al. | 725/39 |
| 2011/0125500 A1* | 5/2011 | Talwar et al. | 704/251 |
| 2012/0072221 A1* | 3/2012 | White et al. | 704/251 |
| 2012/0084079 A1 | 4/2012 | Gruenstein et al. | |
| 2012/0296645 A1* | 11/2012 | Carraux et al. | 704/231 |

OTHER PUBLICATIONS

Fitchard, Kevin, "Nuance Scales Its Voice-Recognition Suite to the Feature Phone," http://connectedplanetonline_comlwireless/news/nuance-scales-voice-recognition-suite-0212/, 3 pages, Published Feb. 19, 2009.

Gomez et al., "Recognition of Coded Speech Transmitted Over Wireless Channels," IEEE Transactions on Wireless Communications, vol. 5, No. 9, Sep. 2006, pp. 2555-2562.

Kuhn, R. and R. De Mori, "A Cache-Based Natural Language Model for Speech Recognition," IEEE Transactions on Pattern Analysis and Machine Intelligence, vol. 12, Issue 6, Jun. 1990, pp. 570-583.

Zhang et al., "The Study on Distributed Speech Recognition System," IEEE International Conference on Acoustics, Speech, and Signal Processing, vol. 3, 2000, pp. 1431-1434.

International Search Report and the Written Opinion of the International Searching Authority for International application No. PCT/US20 11/022427, mailed Apr. 28, 2011, 10 pages.

Office Action issued in U.S. Appl. No. 13/287,913 on Feb. 16, 2012, 16 pages.

Office Action issued in U.S. Appl. No. 12/794,896 on Aug. 3, 2012, 15 pages.

International Preliminary Report on Patentability issued in PCT/US2011/022427 on Aug. 9, 2012, 8 pages.

Office Action issued in U.S. Appl. No. 13/287,913 on Aug. 20, 2012, 24 pages.

Notice of Allowance issued in U.S. Appl. No. 13/287,913 on Jan. 7, 2013, 26 pages.

Corrected Notice of Allowability issued in U.S. Appl. No. 13/287,913 on Feb. 7, 2013, 15 pages.

Office Action issued in U.S. Appl. No. 12/794,896 on Feb. 26, 2013, 31 pages.

Office Action issued in U.S. Appl. No. 12/794,896 on Sep. 6, 2013, 46 pages.

Office Action issued in Chinese Application No. 201180013111.0 on Sep. 17, 2013, with English translation, 11 pages.

Office Action issued in Australian Application No. 2011209760 on Oct. 18, 2013, 3 pages.

* cited by examiner

INTEGRATION OF EMBEDDED AND NETWORK SPEECH RECOGNIZERS

CROSS-REFERENCE TO RELATED APPLICATIONS

This application is a continuation of U.S. patent application Ser. No. 12/794,896, filed on Jun. 7, 2010, which claims the benefit of U.S. Provisional Application Ser. No. 61/298,251, filed on Jan. 26, 2010, the entirety of which are hereby incorporated by reference as if fully set forth therein.

BACKGROUND

1. Field

This description generally relates to the field of speech recognition.

2. Background

Speech recognition systems in mobile devices allow users to communicate and provide commands to the mobile device with minimal usage of input controls such as, for example, keypads, buttons, and dials. Some speech recognition tasks can be a complex process for mobile devices, requiring an extensive analysis of speech signals and search of word and language statistical models. This is because mobile devices typically have limited computational, memory, and battery resources. As such, more complex speech recognition tasks are oftentimes offloaded to speech recognition systems located externally to the mobile device such as, for example, speech recognition systems in network servers.

Since more complex speech recognition tasks are performed on network servers and not on the mobile device, the results of the voice command may be limited to data stored in the network server. For these speech recognition tasks, the mobile device user does not have the benefit of viewing query results that may correspond to the voice command based on data stored in the mobile device. In addition, the delay time in transferring the voice command to the network server, performing the speech recognition operation at the network server, and transferring the query result from the network server to the mobile device can be significant. Significant delay time in the execution of applications on mobile devices, such as speech recognition tasks, can lead to a poor user experience.

Methods and systems are needed for performing speech recognition tasks on a client device, such as a mobile device, to overcome the above-noted limitations of speech recognition systems in mobile applications.

SUMMARY

Embodiments include a method for performing a voice command on a client device. The method includes translating, using a first speech recognizer located on the client device, an audio stream of a voice command to a first machine-readable voice command and generating a first query result using the first machine-readable voice command to query a client database. In addition, the audio stream can be transmitted to a remote server device that translates the audio stream to a second machine-readable voice command using a second speech recognizer. Further, the method includes receiving a second query result from the remote server device, where the second query result is generated by the remote server device using the second machine-readable voice command to query a remote server database, and displaying the first query result and the second query result on the client device. The transmission of the audio stream to the remote server device and the transmission of the second query result from the remote server device to the client device can occur simultaneously, substantially at the same time as, or a time period that overlaps with the generation of the first query result by the client device.

Embodiments additionally include a computer program product that includes a computer-usable medium with computer program logic recorded thereon for enabling a processor to perform a voice command on a client device. The computer program logic includes the following: first computer readable program code that enables a processor to translate, using a first speech recognizer located on the client device, an audio stream of a voice command to a first machine-readable voice command; second computer readable program code that enables a processor to generate a first query result using the first machine-readable voice command to query a client database; third computer readable program code that enables a processor to transmit the audio stream to a remote server device that translates the audio stream to a second machine-readable voice command using a second speech recognizer; fourth computer readable program code that enables a processor to process a second query result from the remote server device, wherein the second query result is generated by the remote server device using the second machine-readable voice command; and, fifth computer readable program code that enables a processor to a control a display of the first query result and the second query result on the client device.

Embodiments further include a system for performing a voice command on a client device. The system includes a first speech recognizer device, a client query manager, and a display device. The first speech recognizer device is configured to translate an audio stream of a voice command to a first machine-readable voice command. The client query manager is configured to perform the following functions: generate a first query result using the first machine-readable voice command to query a client database; transmit the audio stream to a remote server device that translates the audio stream to a second machine-readable voice command using a second speech recognizer; and, receive a second query result from the remote server device, where the second query result is generated by the remote server device using the second machine-readable voice command to query a remote server database. Further, the display device is configured to display the first query result and the second query result on the client device.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the embodiments and to enable a person skilled in the relevant art to make and use the embodiments.

DETAILED DESCRIPTION

The following detailed description refers to the accompanying drawings that illustrate exemplary embodiments. Other embodiments are possible, and modifications can be made to the embodiments within the spirit and scope of this description. Therefore, the detailed description is not meant to limit the embodiments described below.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

Figure 1:
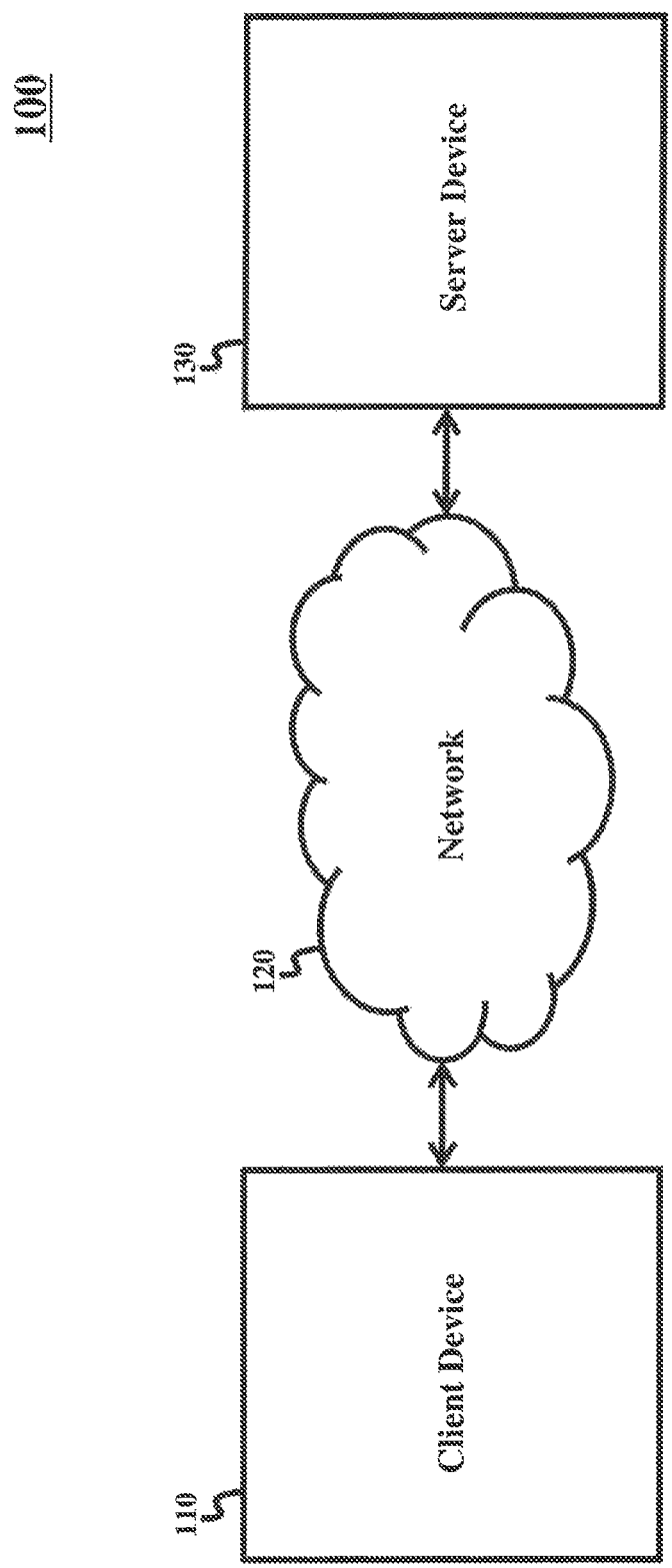
FIG. 1 is an illustration of an exemplary communication system in which embodiments can be implemented.

FIG. 1 is an illustration of an exemplary communication system 100 in which embodiments can be implemented. Communication system 100 includes a client device 110 that is communicatively coupled to a server device 130 via a network 120. Client device 110 can be, for example and without limitation, a mobile phone, a personal digital assistant (PDA), a laptop, or other similar types of mobile devices. Server device 130 can be, for example and without limitation, a telecommunications server, a web server, or other similar types of database servers. In an embodiment, server device 130 can have multiple processors and multiple shared or separate memory components such as, for example and without limitation, one or more computing devices incorporated in a clustered computing environment or server farm. The computing process performed by the clustered computing environment, or server farm, may be carried out across multiple processors located at the same or different locations. In an embodiment, server device 130 can be implemented on a single computing device. Examples of computing devices include, but are not limited to, a central processing unit, an application-specific integrated circuit, or other type of computing device having at least one processor and memory. Further, network 120 can be, for example and without limitation, a wired (e.g., ethernet) or a wireless (e.g., Wi-Fi and 3G) network that communicatively couples client device 110 to server device 130.

Figure 2:
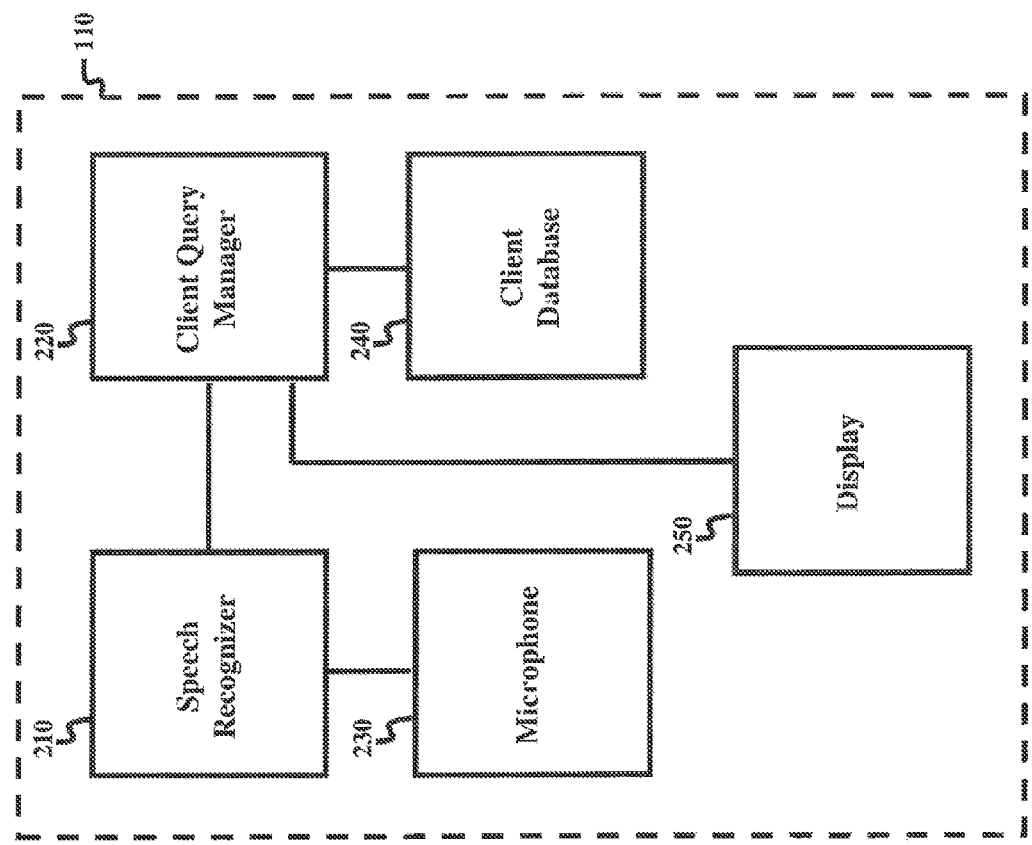
FIG. 2 is an illustration of an embodiment of a client device.

FIG. 2 is an illustration of an embodiment of client device 110. Client device 110 includes a speech recognizer 210, a client query manager 220, a microphone 230, a client database 240, and a display device 250. In an embodiment, microphone 230 is coupled to speech recognizer 210, which is coupled to client query manager 220. Client manager 220 is also coupled to client database 240 and display 250, according to an embodiment.

In an embodiment, speech recognizer 210 and client query manager 220 can be implemented in software, firmware, hardware, or a combination thereof. Embodiments of speech recognizer 210 and client query manager 220, or portions thereof, can also be implemented as computer-readable code executed on one or more computing devices capable of carrying out the functionality described herein. Examples of computing devices include, but are not limited to, a central processing unit, an application-specific integrated circuit, or other type of computing device having at least one processor and memory.

In an embodiment, microphone 230 is configured to receive an audio stream corresponding to a voice command and to provide the voice command to speech recognizer 210. The voice command can be generated from an audio source such as, for example and without limitation, a mobile phone user, according to an embodiment. In turn, speech recognizer 210 is configured to translate the audio stream to a machine-readable voice command, according to an embodiment. Methods and techniques to translate the audio stream to the machine-readable voice command are known to a person of ordinary skill in the relevant art. Examples of these methods and techniques can be found in commercial speech recognition software such as Dragon Naturally Speaking Software and MacSpeech Software, both by Nuance Communications, Inc.

Based on the machine-readable voice command, in an embodiment, client query manager 220 queries client database 240 to generate a query result. In an embodiment, client database 240 contains information that is locally stored in client device 110 such as, for example and without limitation, telephone numbers, address information, and results from previous voice commands (described in further detail below). Based on the description herein, a person of ordinary skill in the relevant art will recognize that other data stored in client database 240 can provide query results to embodiments described herein.

In an embodiment, client query manager 220 also coordinates a transmission of the audio stream corresponding to the voice command to server device 130 via network 120 of FIG. 1. The audio stream can be transmitted to server device 130 in multiple types of audio file formats such as, for example and without limitation, a WAVE audio format. After server device 130 processes the audio stream, which will be described in further detail below, client query manager 220 coordinates a reception of a query result from server device 130 via network 120. The transmission of data to and reception of data from server device 130 can be performed using a transceiver (not shown in FIG. 2), which is known by a person of ordinary skill in the relevant art.

Client query manager 220 of FIG. 2 coordinates the transmission of the audio stream to server device 130 simultaneously, substantially the same time, or in a parallel manner as it queries client database 240, according to an embodiment. As a result, in an embodiment, the query result from server device 130 can be received by client query manager 220 and displayed on display device 250 at substantially the same time as, in parallel with, or soon after the query result from client device 110. In the alternative, depending on the computation time for client query manager 220 to query client database 240 or the complexity of the voice command, the query result from server device 130 can be received by client query manager 220 and displayed on display device 250 prior to the display of a query result from client database 240, according to an embodiment.

In reference to FIG. 2, in an embodiment, display device 250 is configured to display the query results from client database 240 and from server device 130. These query results are stored in client database 240 and may be retrieved at a later time based on a future voice command that is substantially the same as or substantially similar to the voice command used to generate the query results, according to an embodiment.

Figure 3:
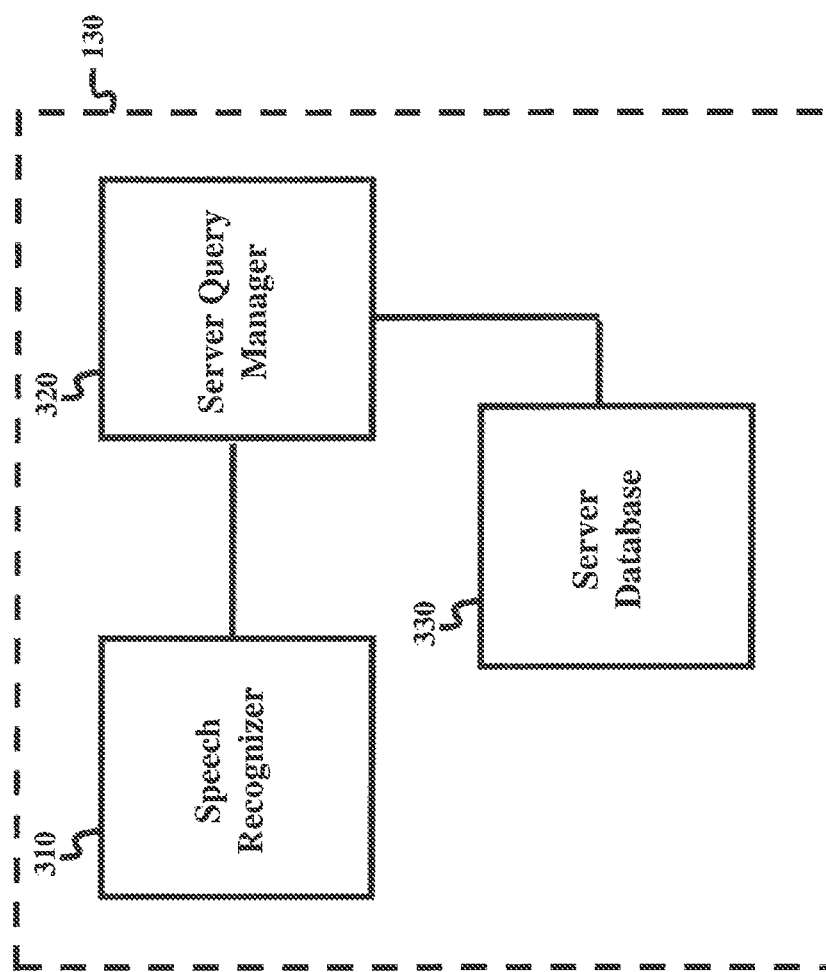
FIG. 3 is an illustration of an embodiment of a server device.

FIG. 3 is an illustration of an embodiment of server device 130. Server device 130 includes a speech recognizer 310, a server query manager 320, and a server database 330. In an embodiment, speech recognizer 310 is coupled to server query manager 320, which is coupled to server database 330.

In an embodiment, speech recognizer 310 and server query manager 320 can be implemented in software, firmware, hardware, or a combination thereof. Embodiments of speech recognizer 310 and server query manager 320, or portions thereof, can also be implemented as computer-readable code executed on one or more computing device capable of carrying out the functionality described herein. Examples of computing devices include, but are not limited to, a central processing unit, an application-specific integrated circuit, or other type of computing device having at least one processor and memory.

As described above, with respect to FIG. 2, server device 130 receives an audio stream corresponding to a voice command from client device 110. In an embodiment, server query manager 320 coordinates the reception of the audio stream from client device 110 via a transceiver (not shown in FIG. 3) and transfer of the audio stream to speech recognizer 310. In turn, speech recognizer 310 is configured to translate the audio stream to a machine-readable voice command, according to an embodiment of the present.

In an embodiment, speech recognizer 310 is configured to translate both simple speech recognition tasks, as well as more complex speech recognition tasks than those tasks translated by speech recognizer 210 in client device 110. This is because speech recognizer 310 has more computational and memory resources than speech recognizer 210 to translate more complex voice commands to corresponding machine-readable voice commands, according to an embodiment. Methods and techniques to process complex speech recognition tasks are known to a person of ordinary skill in the relevant art.

Based on the machine-readable voice command translated by speech recognizer 310, in an embodiment, server query manager 320 queries server database 330 to generate a query result. In an embodiment, server database 330 contains a wide array of information such as, for example and without limitation, text data, image data, and video. Based on the description herein, a person of ordinary skill in the relevant art will recognize that other data stored in server database 330 can provide query results to embodiments described herein.

After a query result is retrieved from server database 330, server query manager 320 coordinates a transmission of the query result to client device 110 via network 120 of FIG. 1. The transmission of data to and the reception of data from client device 110 can be performed using a transceiver (not shown in FIG. 3), which is known by a person of ordinary skill in the relevant art.

Figure 4:
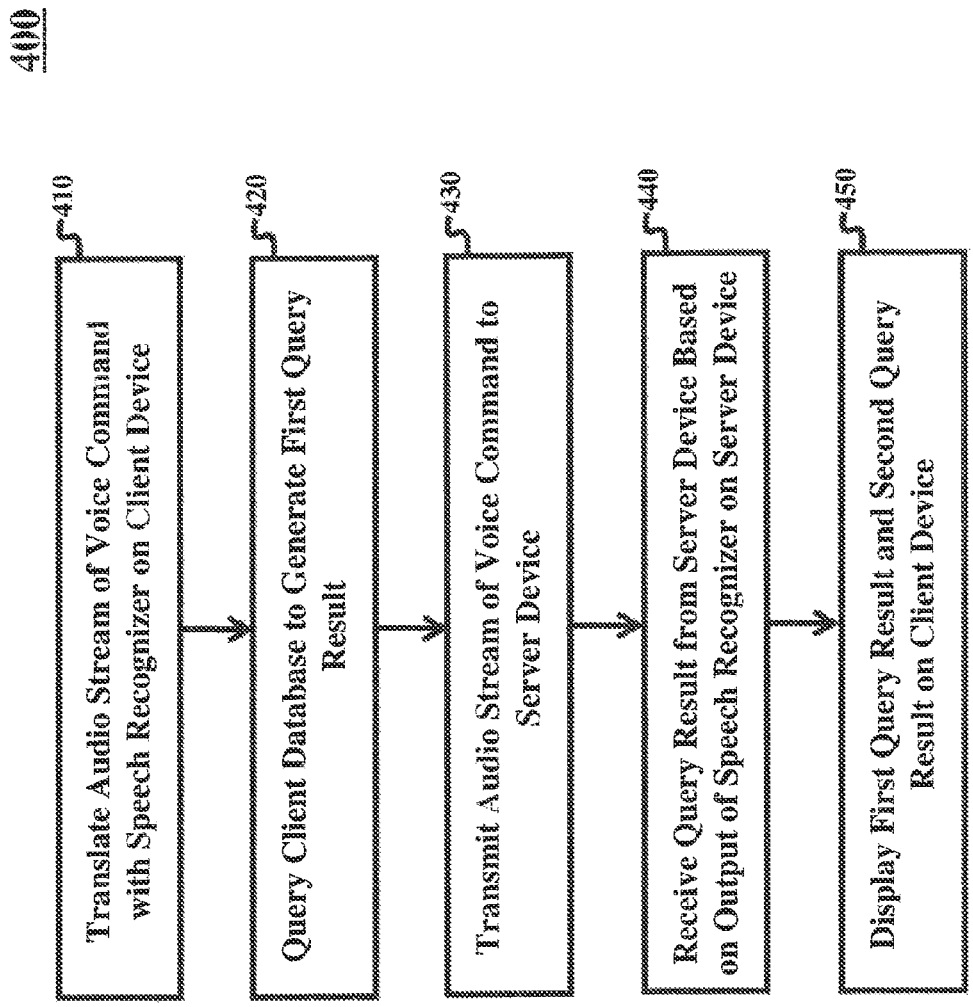
FIG. 4 is an illustration of an embodiment of a method for performing a voice command on a client device.

FIG. 4 is an illustration of an embodiment of a method 400 for performing a voice command on a client device. Method 400 can occur using, for example, client device 110 in communication system 100 of FIG. 1. Unlike speech recognition systems that offload more complex voice commands to a server device for processing and returns a corresponding query result to the client device, a speech recognition system performing in accordance with method 400 processes both simple and complex voice commands on the client device as well as the server device. The query results generated by both the client device and the server device provide information from a client database and a server database, respectively. As a result, the user of the client device receives the benefit of viewing query results that may correspond to the voice command based on data stored on the client device as well as data stored on the server device.

For ease of explanation, communication system 100 will be used to facilitate in the description of method 400. However, based on description herein, a person of ordinary skill in the relevant art will recognize that method 400 can be executed on other communication systems. These other communication systems are within the scope and spirit of the embodiments described herein.

Further, for ease of explanation, method 400 will be described in the context of a mobile phone (e.g., client device 110 of FIG. 1) with a mobile phone user as the audio source of the voice command. The mobile phone is communicatively coupled to a network server (e.g., server device 130 of FIG. 1) via a communications network (e.g., network 120 of FIG. 1). Based on the description herein, a person of ordinary skill in the relevant art will recognize that method 400 can be executed on other types of client devices such as, for example and without limitation, a PDA and a laptop and with other audio sources such as, for example and without limitation, a radio and a computer. These other types of client devices and audio sources are within the scope and spirit of the embodiments described herein.

In step 410, an audio stream of a voice command is translated into a machine-readable voice command with a speech recognizer located on the mobile phone. As described above, with respect to FIG. 2, speech recognizer 210 translates the audio stream received by microphone 230.

In step 420, a query is made to a database of the mobile phone to generate a query result based on the machine-readable voice command generated from step 410. In reference to FIG. 2, based on the machine-readable voice command translated by speech recognizer 210, client query manager 220 queries client database 240 to generate the query result.

Figure 5:
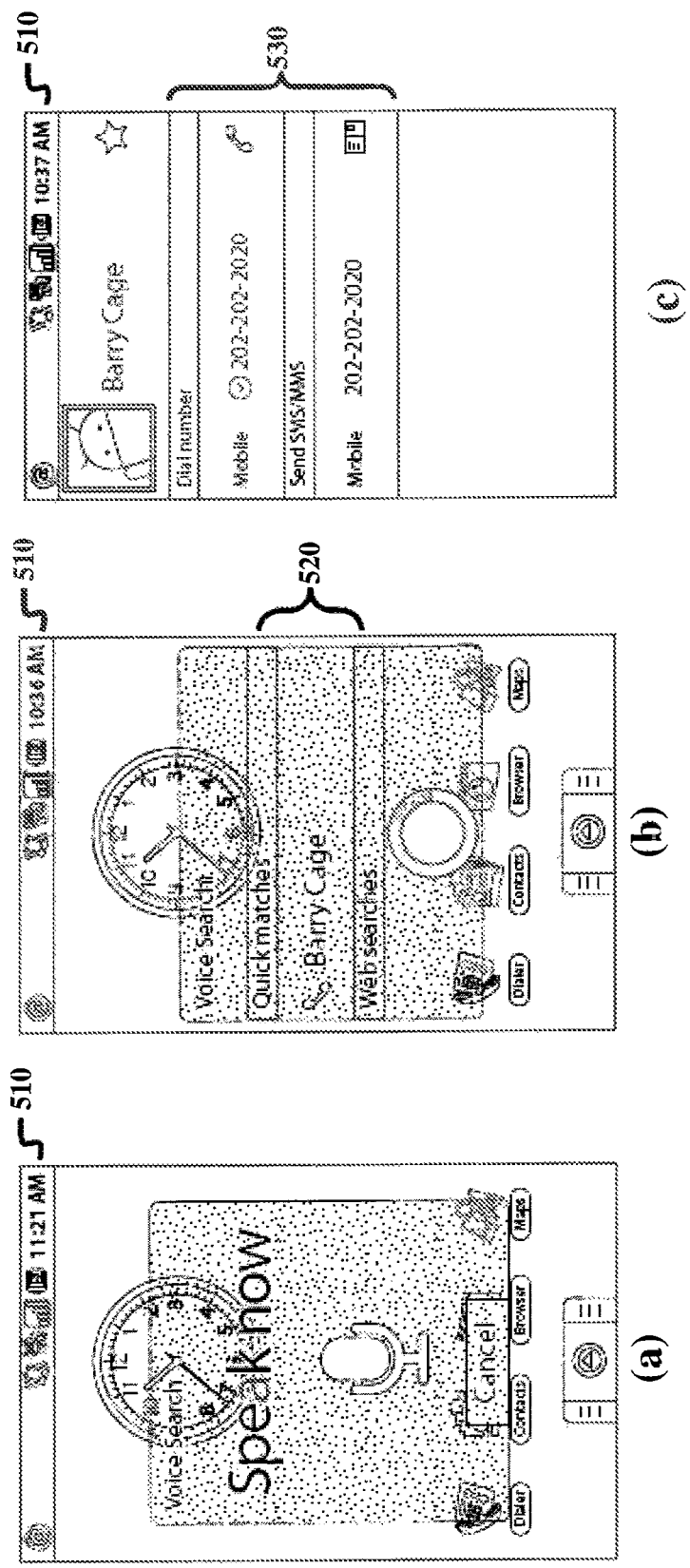
FIGS. 5A, 5B and 5C are illustrations of an exemplary user interface on a mobile phone in accordance with embodiments.

FIGS. 5(*a*)-(*c*) are illustrations of an exemplary user interface (UI) 510 on a mobile phone in accordance with embodiments described herein. These illustrations are used to help facilitate in the explanation of steps 410 and 420 of FIG. 4.

With respect to FIG. 5(*a*), mobile phone UI 510 prompts the mobile phone user for a voice command. In this example, the mobile phone user provides "Barry Cage" as the voice command. In turn, in accordance with step 410, the mobile phone translates the audio stream of the voice command into a machine-readable voice command using its embedded speech recognizer (e.g., speech recognizer 210 of FIG. 2). A query manager on the mobile phone (e.g., client query manager 220 of FIG. 2) queries the mobile phone's database for "Barry Cage."

With respect to FIG. 5(*b*), the mobile phone's query manager queries a contact list database for the name "Barry Cage" and finds a query result 520. Based on the description herein, a person of ordinary skill in the relevant art will recognize that other databases on the mobile phone can be queried to generate the query result such as, for example and without limitation, call log information, music libraries, and calendar listings.

With respect to FIG. 5(c), the mobile phone user can select query result 520 to view contact information 530 corresponding to the voice command.

In reference to FIG. 4, in step 430, the audio stream of the voice command is transmitted to a network server, where the voice command is translated to a machine-readable voice command with a speech recognizer located on the network server. As described above, with respect to FIG. 2, client query manager 220 coordinates a transmission of the audio stream to server device 130.

In step 440, a query result is received from the network server, where the query result is generated from a query made to a server database based on the machine-readable voice command from step 430. With respect to FIG. 3, speech recognizer 310 translates the voice command to the machine-readable voice command. Based on the machine-readable voice command, server query manager 320 queries server database 330 to generate the query result. This query result is then transmitted from server device 130 to client device 110 via network 120.

Figure 6:
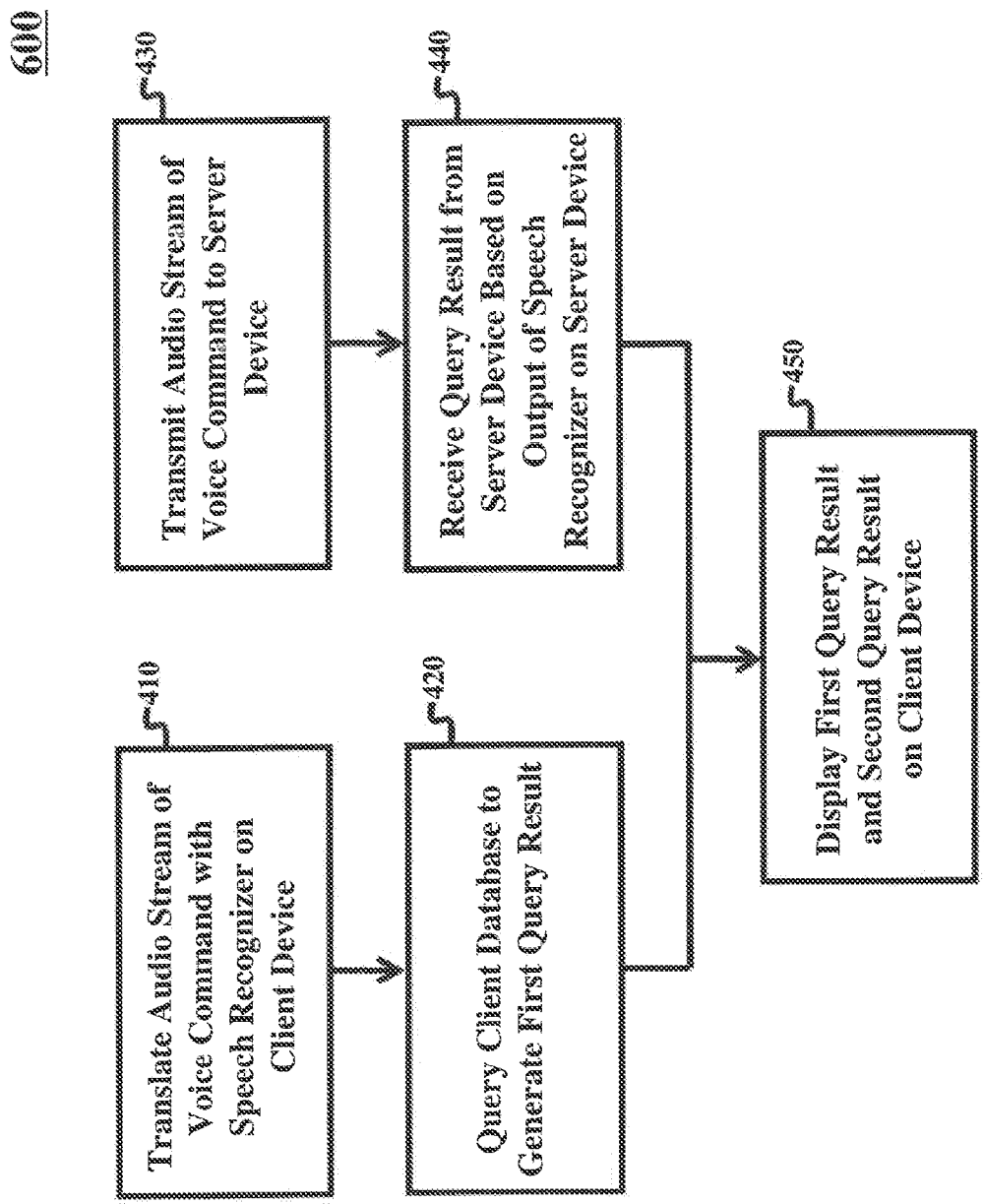
FIG. 6 is an illustration of an embodiment of a method for performing a voice command on a client device.

In an embodiment, as illustrated in method 600 of FIG. 6, the transmission of the audio stream to the network server (step 430) and the reception of the query result from the network server (step 440) can be performed simultaneously with, substantially at the same time as, or to overlap with the translation of the audio stream of the voice command by the mobile phone (step 410) and query of the database on the mobile phone (step 420). As a result, in an embodiment, the query result from the network server can be received by and displayed on the mobile phone at substantially the same time as, in parallel with, or soon after a display of the query result from the database of the mobile phone. In the alternative, depending on the computation time to query the mobile phone's database or the complexity of the voice command, the query result from the network server can be received by and displayed on the mobile phone prior to the display of the query result from the mobile phone's database, according to an embodiment.

In step 450 of FIG. 4, the query result from step 420 and the query result from step 440 are displayed on the mobile phone. In an embodiment, the query results from steps 420 and 440 are stored in the database of the mobile phone and may be displayed based on a future voice command by the mobile phone user.

FIGS. 7(a) and 7(b) are illustrations of an exemplary UI 710 on a mobile phone in accordance with embodiments described herein. These illustrations are used to help facilitate in the explanation of steps 430-450 of FIG. 4.

Similar to FIG. 5, the illustrations of FIGS. 7(a) and 7(b) assume that the mobile phone user provides "Barry Cage" as the voice command. With respect to FIG. 7(a), in accordance with steps 410 and 420 of FIG. 4, field 720 displays a query result from a query made to the mobile phone's database (e.g., client database 240 of FIG. 2). In addition, in accordance with steps 430-450, field 730 displays a query result from a query made to the network server (e.g., server database 330 of FIG. 3).

In the example of FIG. 7(a), field 730 is a list of three entries in which the network server returns as possible matches for the voice command: "barry cage"; "mary paige"; and, "mary peach." If the mobile phone user does not decide to select an entry from field 720 (i.e., "Barry Cage"), then the mobile phone user can select an entry from field 730. In addition, a partial portion of the list in field 630 can be received by and displayed on the mobile phone at a first time instance and the remainder of the list in field 730 can be received by and displayed on the mobile phone at a second time instance (e.g., later in time than the first time instance). In this way, the mobile phone user can view a portion of the query results as the remainder of the query results is being processed by the network server and received by the mobile phone.

With respect to FIG. 7(b), if the mobile phone user selects "barry cage" from field 730 of FIG. 7(a), then results 740 from a web search is displayed on the mobile phone. The mobile phone user can then scroll through search results 740 to locate a hyperlink of interest. In accordance with step 450 of FIG. 4, search results 740 and the query result from step 420 of FIG. 4 (e.g., field 720 of FIG. 7(a)) are stored in the mobile phone for a future voice command by the mobile phone user, according to an embodiment. For instance, if the mobile phone user provides "Barry Cage" as a voice command at a later point in time, "Barry Cage" in field 720 and "barry cage" in field 730 of FIG. 7(a) would be retrieved from the mobile phone's memory and displayed to the mobile phone user. In storing the web search result for "Barry Cage," the mobile phone user receives the benefit of viewing a previously-selected web search result. In turn, the mobile phone user's experience is enhanced since the mobile phone is able to quickly recall a selected entry from a previous voice command. An exemplary method and system to store and retrieve data in fields 720 and 730 of FIG. 7(a) can be found in U.S. patent application Ser. No. 12/783,470, which is entitled "Personalization and Latency Reduction for Voice-Activated Commands" and incorporated herein by reference in its entirety.

Figure 8:
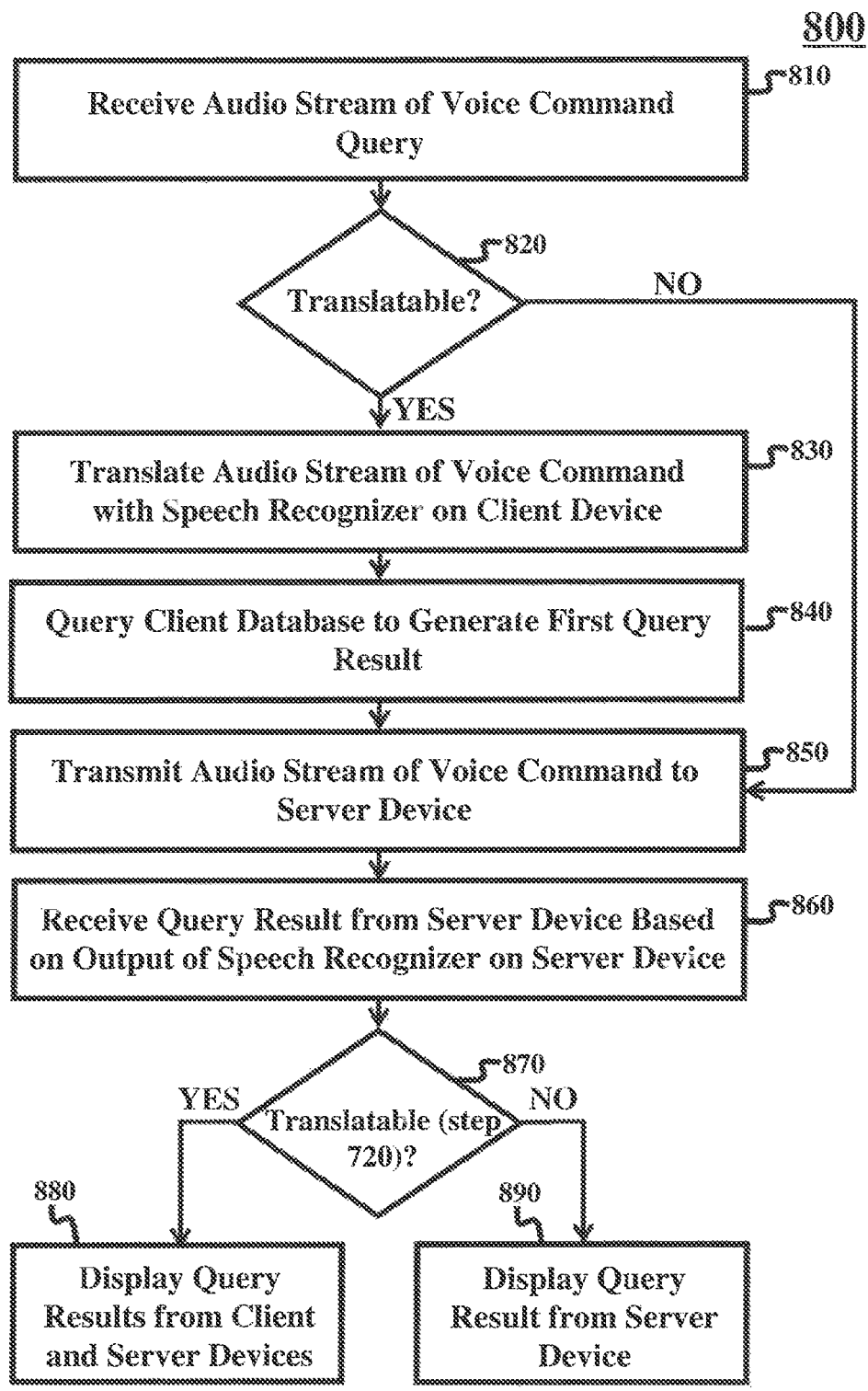
FIG. 8 is an illustration of an embodiment of another method for performing a voice command on a client device.

FIG. 8 is an illustration of another method 800 for performing a voice command on a client device. Method 800 can occur using, for example, client device 110 in communication system 100 of FIG. 1. Similar to method 400 of FIG. 4, for ease of explanation, communication system 100 will be used to facilitate in the description of method 800. Further, for ease of explanation, method 800 will be described in context of a mobile phone (e.g., client device 110 of FIG. 1) with a mobile phone user as the audio source of the voice command.

In step 810, an audio stream of a voice command is received by the mobile phone. As described above, with respect to FIG. 2, microphone 230 is configured to receive the audio stream of the voice command.

In step 820, a speech recognizer located on the mobile phone determines whether the audio stream (from step 810) can be translated into a machine-readable voice command with an appropriate confidence score. In an embodiment, due to computational and memory resources of the mobile phone, the speech recognizer located on the mobile phone (e.g., speech recognizer 210 of FIG. 2) may not be able to translate more complex voice command into corresponding machine-readable voice commands with relatively high confidence scores. In particular, if a speech recognition confidence score for the voice command is below a predetermined threshold, then a query is not made to a database of the mobile phone based on the voice command, according to an embodiment. Instead, in an embodiment, the mobile phone stores the machine-readable voice command with the relatively low confidence score for future recall by the mobile phone. This future recall feature will be described in further detail below. Methods and techniques to determine speech recognition confidence scores are known to a person of ordinary skill in the relevant art.

In step 830, if the speech recognizer located on the mobile phone is able to provide a machine-readable voice command translation for the audio stream of the voice command, then the voice command is translated into the machine-readable voice command with the speech recognizer located on the mobile phone. Step 830 performs a similar function as step 410 of FIG. 4.

In step 840, a query is made on a database of the mobile phone to generate a query result based on the machine-readable voice command generated from step 830. Step 840 performs a similar function as step 420 of FIG. 4.

In step 850, regardless of whether the speech recognizer located on the mobile phone is able to provide the machine-readable voice command translation for the audio stream of the voice command with the appropriate confidence score, the audio stream of the voice command is transmitted to a network server, where the voice command is translated to a machine-readable voice command with a speech recognizer located on the network server. Step 850 performs a similar function as step 430 of FIG. 4.

In step 860, a query result is received from the network server, where the query result is generated from a query made to a server database based on the machine-readable voice command from step 850. Step 860 performs a similar function as step 440 of FIG. 4.

Figure 9:
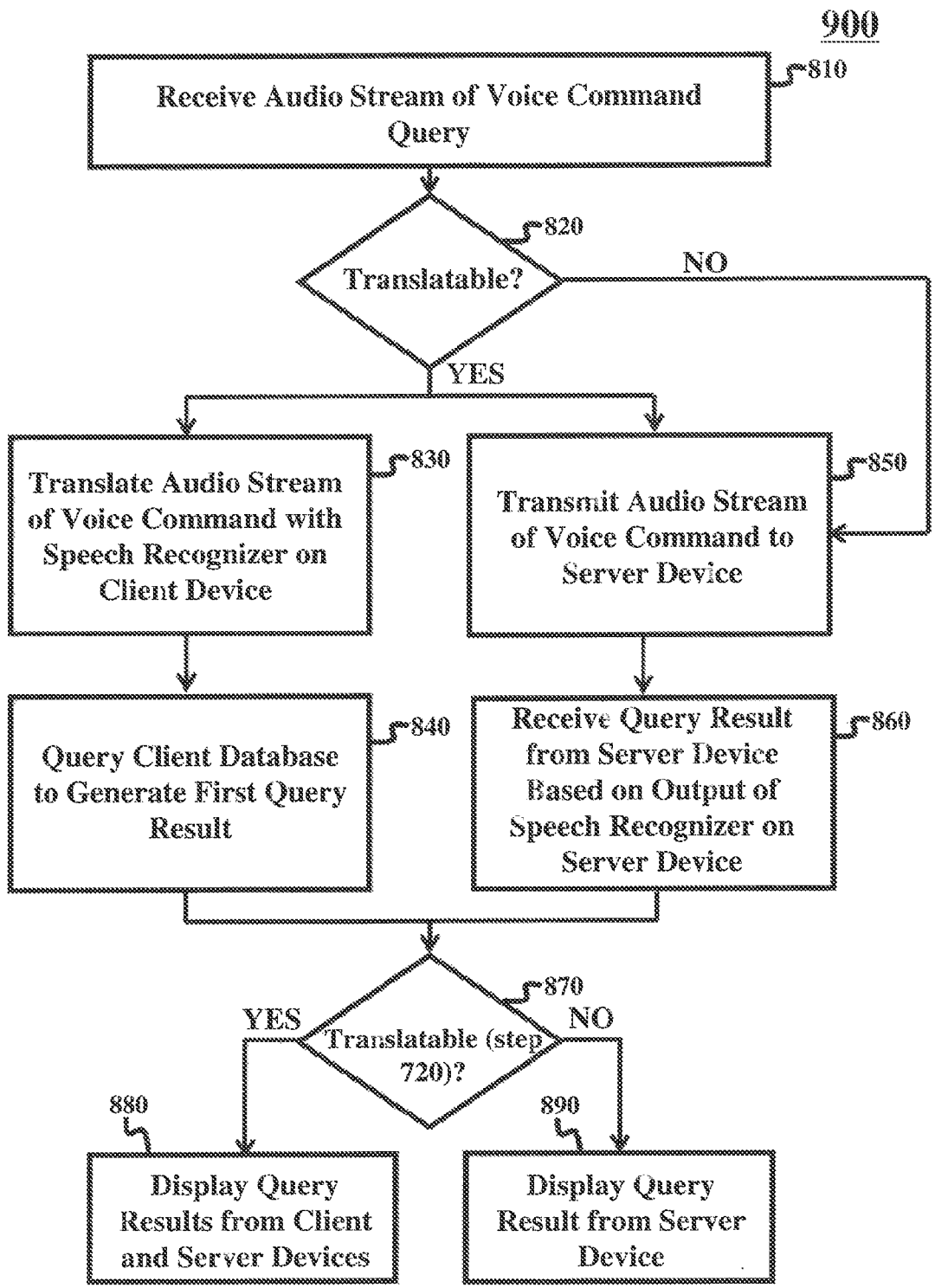
FIG. 9 is an illustration of an embodiment of another method for performing a voice command on a client device.

FIG. 9 is an illustration of another method 900 for performing a voice command on a client device. Similar to steps 430 and 440 of FIG. 6, steps 860 and 870 of FIG. 8 can be performed simultaneously with, substantially at the same time as, to overlap with the translation of the audio stream of the voice command by the mobile phone (step 830) and query of the database on the mobile phone (step 840), according to an embodiment. As a result, in an embodiment, the query result from the network server can be received by and displayed on the mobile phone at substantially the same time as, in parallel with, or soon after a display of the query result from the database of the mobile phone. In the alternative, depending on the computation time to query the mobile phone's database or the complexity of the voice command, the query result from the network server can be received by and displayed on the mobile phone prior to the display of a query result from the mobile phone's database, according to an embodiment.

In reference to step 880 of FIG. 8, if the speech recognizer located on the mobile phone is able to provide a machine-readable voice command translation for the audio stream of the voice command (see step 870), the query result from step 820 and the query result from 840 are displayed on the mobile phone (see step 880). In an embodiment, the query results from steps 820 and 840 are stored in the database of the mobile phone for a future voice command by the mobile phone user.

In the alternative, if the speech recognizer located on the mobile device is not able to provide a machine-readable voice command translation for the audio stream of the voice command (see step 870), then only the query result from step 840 is displayed on the mobile phone (see step 890). In an embodiment, the query result from step 840 is stored in the database of the mobile phone for a future voice command by the mobile phone user.

In an embodiment, a future voice command can be translated into a machine-readable voice command, in which this machine-readable voice command can be compared to the machine-readable voice command with the relatively low confidence score (from step 820 of FIG. 2). If the two machine-readable voice commands substantially match one another or are substantially similar to one another, then the mobile phone displays the query result from step 820 and/or the query result from step 840, according to an embodiment.

Figure 7:
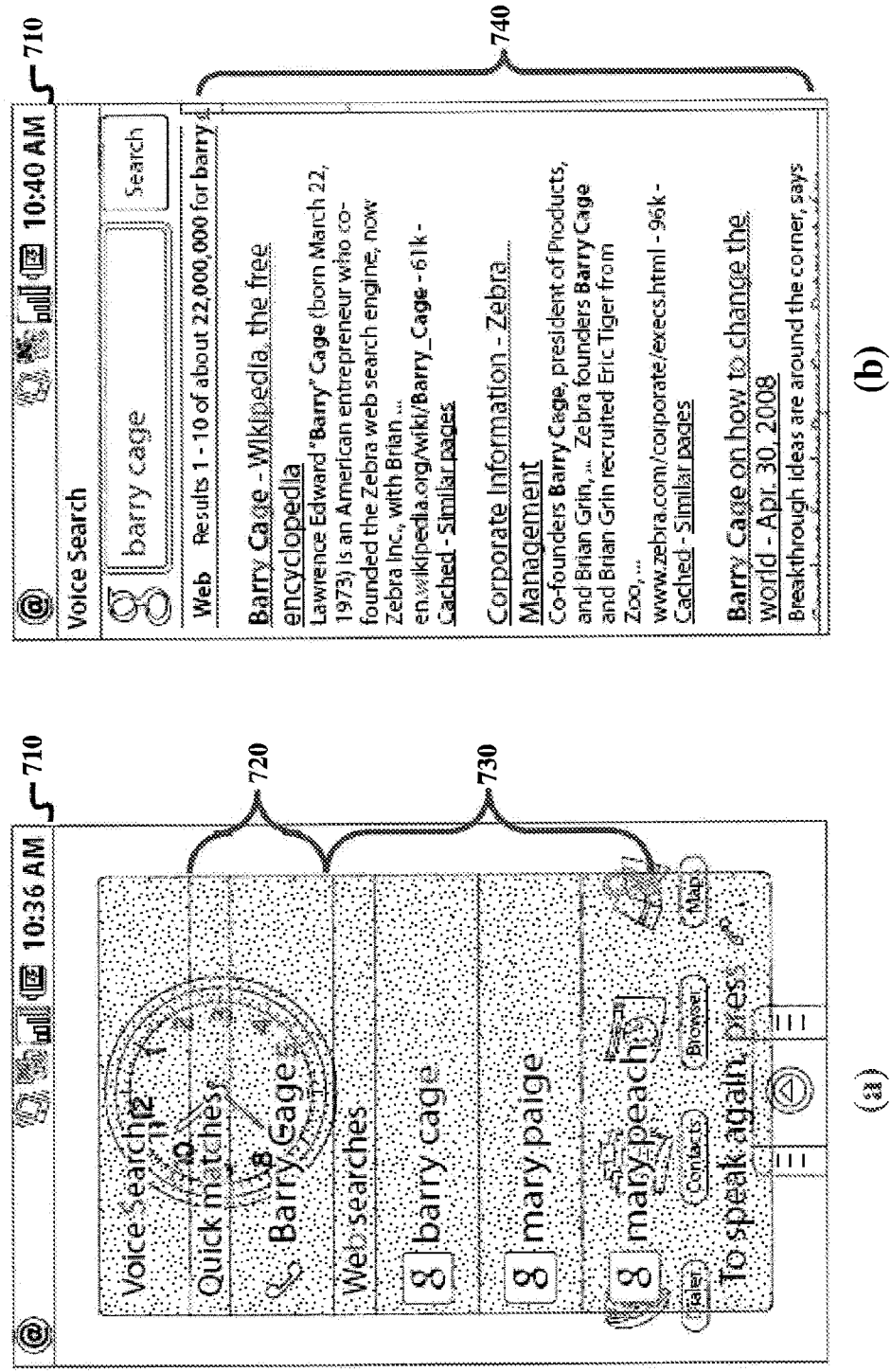
FIGS. 7A and 7B are illustrations of another exemplary user interface on a mobile phone in accordance with embodiments.

An exemplary method and system to store and retrieve data in fields 720 and 730 of FIG. 7(*a*) can be found in U.S. patent application Ser. No. 12/783,470, which is entitled "Personalization and Latency Reduction for Voice-Activated Commands" and incorporated herein by reference in its entirety.

In addition, according to an embodiment, the audio stream corresponding to the future voice command is transmitted to the network server, where the voice command is translated to a machine-readable voice command with the speech recognizer located on the network server. Based on the machine-readable voice command corresponding to the future voice command, in an embodiment, a query is made to a database on the network server to generate a query result. This query result is received by, displayed on, and stored in the mobile phone, according to an embodiment.

A benefit, among others, in displaying the stored query result corresponding to the prior voice command and another query result corresponding to the future voice command is that the mobile phone user receives the benefit of viewing an updated query result (if any) from the network server, according to an embodiment. In addition, in an embodiment, the speech recognizer on the mobile phone may mischaracterize the future voice command as corresponding to a previously-stored voice command. In this case, the speech recognizer located on the network server may be able to resolve the mischaracterization by providing a more accurate translation of the future voice command than the translation provided by speech recognizer located on the mobile phone, according to an embodiment.

Figure 10:
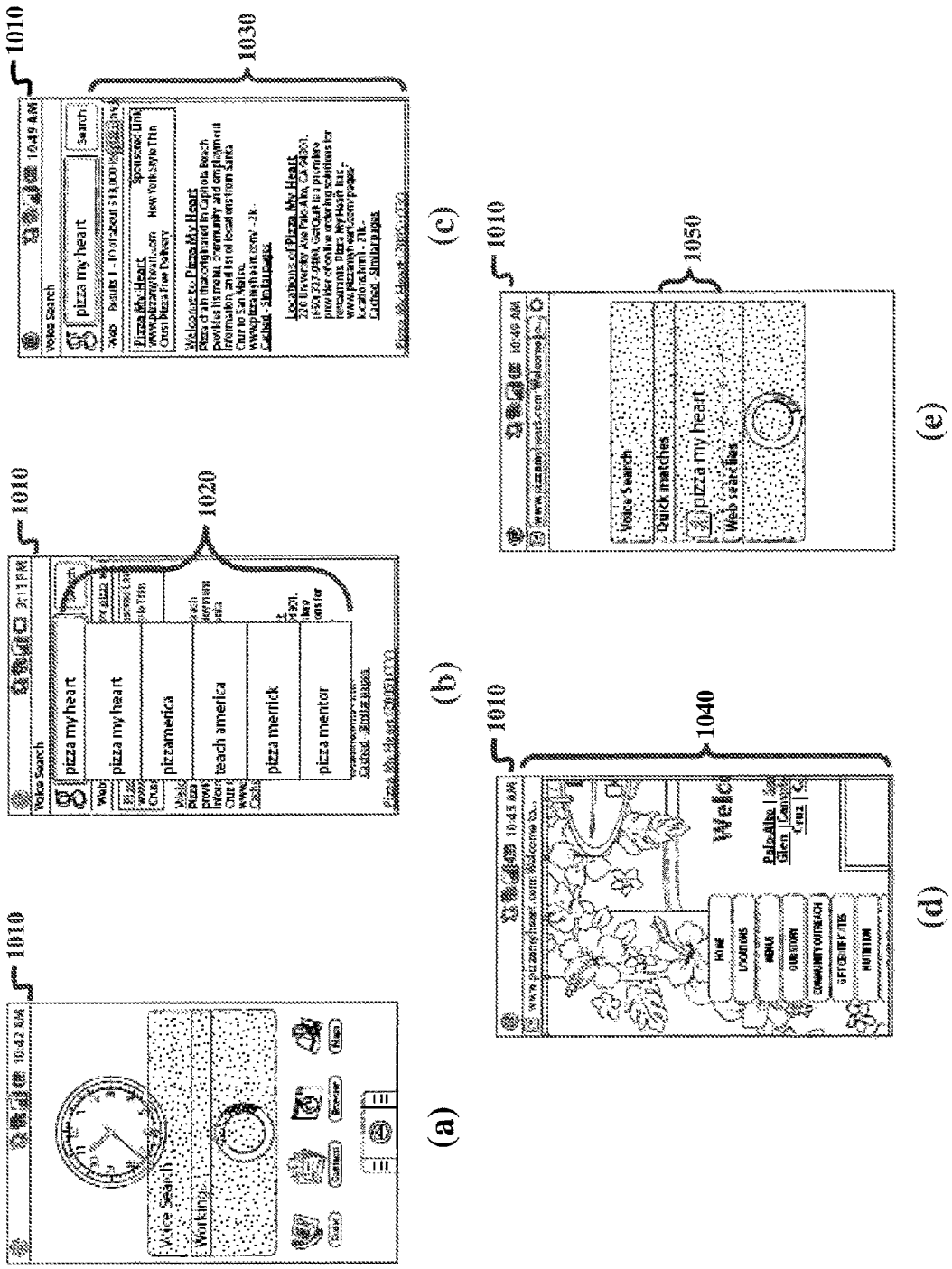
FIGS. 10A, 10B, 10C, 10D, and 10E are illustrations of yet another exemplary user interface on a mobile phone in accordance with embodiments.

FIGS. 10(*a*)-(*e*) are illustrations of an exemplary UI 1010 on a mobile phone in accordance with embodiments described herein. These illustrations are used to help facilitate in the explanation of method 800.

With respect to FIG. 10(*a*), mobile phone UI 1010 prompts the mobile phone user for a voice command. In this example, the mobile phone user provides "pizza my heart" as the voice command. In turn, in accordance with steps 810 and 820, the mobile phone receives the voice command and determines whether the audio stream of the voice command can be translated into a machine-readable voice command with an appropriate confidence score.

In the example illustrated in FIG. 10, the voice command "pizza my heart" does not return a speech recognition confidence score above the predetermined threshold value. In other words, the voice command "pizza my heart" does not return a high-confidence match from the speech recognizer located on the mobile phone. The audio stream of the voice command is transmitted to a network server for further speech recognition processing, in accordance with step 850.

FIG. 10(*b*) is an illustration of an exemplary list of query results 1020 from the voice command made to the network server. Exemplary list of query results 1020 is transmitted from the network server to the mobile phone, in accordance with step 850. In an embodiment, as the mobile phone user views exemplary list of query results 1020, information relating to each of the query results (e.g., web pages, images, text data) is stored in cache memory of the mobile phone. This allows the mobile user to select a query result of interest from exemplary list of query results 1020 and instantly view information relating to the query result, thus improving the mobile phone user's experience. For instance, with respect to FIG. 10(*c*), the mobile phone user selects the top entry "pizza my heart" from exemplary list of query results 1020 and a list of web search results 1030 is displayed on the mobile phone. From the web search results, the mobile phone user can select a hyperlink of interest (e.g., www.pizzamyheart.com) and view the contents of the web page on the mobile phone, as illustrated in a web page 1040 of FIG. 10(*d*).

Further, in an embodiment of step 850, a partial portion of the exemplary list of query results can be received by and displayed on the mobile phone at a first time instance and the remainder of the exemplary list of query results can be received by and displayed on the mobile phone at a second time instance (e.g., later in time than the first time instance). In this way, the mobile phone user can view a portion of the query results as the remainder of the query results is being processed by the network server and received by the mobile phone.

In an embodiment, the query result selected by the mobile phone user (e.g., www.pizzamyheart.com) is stored in the database of the mobile phone for a future voice command by the mobile phone user. For instance, the hyperlink "www.pizzamyheart.com" appears as a query result from a query made to the database of the mobile phone when, at a later time, the mobile phone user provides "pizza my heart" as a voice command to the mobile phone. This is illustrated in field 1050 of FIG. 10(*e*). The mobile phone user can select the query result in field 1050 and view the web page at "www.pizzamyheart.com," as illustrated in FIG. 10(*d*). In storing the query result and associated web page, the mobile phone user receives the benefit of viewing a previously-selected web search result. In turn, the mobile phone user's experience is enhanced since the mobile phone is able to quickly recall a selected entry from a previous voice command. An exemplary method and system to store and retrieve data in field 1050 of FIG. 10(*e*) can be found in U.S. patent application Ser. No. 12/783,470, which is entitled "Personalization and Latency Reduction for Voice-Activated Commands" and incorporated herein by reference in its entirety.

Figure 11:
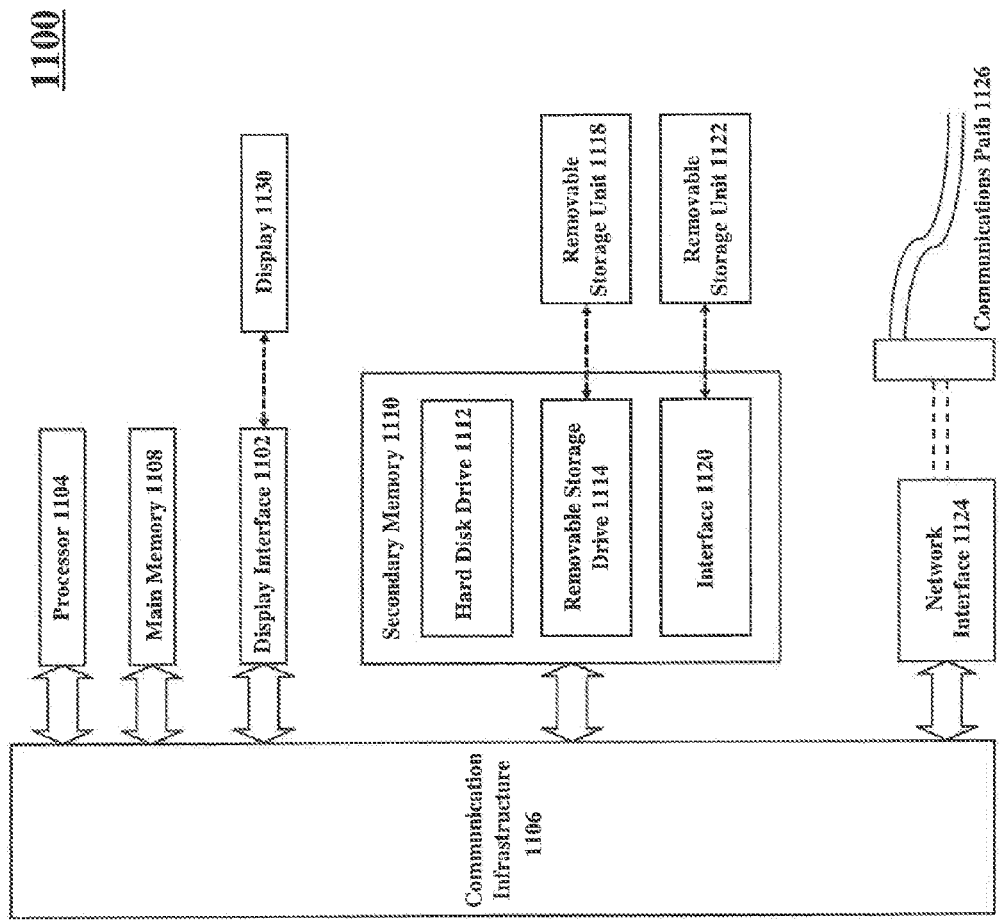
FIG. 11 is an illustration of an example computer system in which embodiments can be implemented.

Various aspects of the embodiments described herein may be implemented in software, firmware, hardware, or a combination thereof. FIG. 11 is an illustration of an example computer system 1100 in which embodiments, or portions thereof, can be implemented as computer-readable code. For example, the methods illustrated by flowchart 400 of FIG. 4, flowchart 600 of FIG. 6, flowchart 800 of FIG. 8, or flowchart 900 of FIG. 9 can be implemented in computer system 1100. Various embodiments are described in terms of this example computer system 1100. After reading this description, it will become apparent to a person skilled in the relevant art how to implement embodiments described herein using other computer systems and/or computer architectures.

Computer system 1100 is an example computing device and includes one or more processors, such as processor 1104. Processor 1104 may be a special purpose or a general-purpose processor. Processor 1104 is connected to a communication infrastructure 1106 (e.g., a bus or network).

Computer system 1100 also includes a main memory 1108, preferably random access memory (RAM), and may also include a secondary memory 1110. Secondary memory 1110 can include, for example, a hard disk drive 1112, a removable storage drive 1114, and/or a memory stick. Removable storage drive 1114 can comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 can include a floppy disk, magnetic tape, optical disk, etc. which is read by and written to by removable storage drive 1114. As will be appreciated by persons skilled in the relevant art, removable storage unit 1118 includes a computer-usable storage medium having stored therein computer software and/or data.

In alternative implementations, secondary memory 1110 can include other similar devices for allowing computer programs or other instructions to be loaded into computer system 1100. Such devices can include, for example, a removable storage unit 1122 and an interface 1120. Examples of such devices can include a program cartridge and cartridge interface (such as those found in video game devices), a removable memory chip (e.g., EPROM or PROM) and associated socket, and other removable storage units 1122 and interfaces 1120 which allow software and data to be transferred from the removable storage unit 1122 to computer system 1100.

Computer system 1100 can also include a communications interface 1124. Communications interface 1124 allows software and data to be transferred between computer system 1100 and external devices. Communications interface 1124 can include a modem, a network interface (such as an Ethernet card), a communications port, a PCMCIA slot and card, or the like. Software and data transferred via communications interface 1124 are in the form of signals, which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 1118, removable storage unit 1122, and a hard disk installed in hard disk drive 1112. Computer program medium and computer-usable medium can also refer to memories, such as main memory 1108 and secondary memory 1110, which can be memory semiconductors (e.g., DRAMs, etc.). These computer program products provide software to computer system 1100.

Computer programs (also called computer control logic) are stored in main memory 1108 and/or secondary memory 1110. Computer programs may also be received via communications interface 1124. Such computer programs, when executed, enable computer system 1100 to implement embodiments discussed herein. In particular, the computer programs, when executed, enable processor 904 to implement processes described above, such as the steps in the methods illustrated by flowchart 400 of FIG. 4, flowchart 600 of FIG. 6, flowchart 800 of FIG. 8, and flowchart 900 of FIG. 9, discussed above. Accordingly, such computer programs represent controllers of the computer system 1100. Where embodiments described herein are implemented using software, the software can be stored in a computer program product and loaded into computer system 1100 using removable storage drive 1114, interface 1120, hard drive 1112 or communications interface 1124.

Based on the description herein, a person of ordinary skill in the relevant will recognize that the computer programs, when executed, can enable one or more processors to implement processes described above, such as the steps in the methods illustrated by flowchart 400 of FIG. 4, flowchart 600 of FIG. 6, flowchart 800 of FIG. 8, and flowchart 900 of FIG. 9. In an embodiment, the one or more processors can be part of a computing device incorporated in a clustered computing environment or server farm. Further, in an embodiment, the computing process performed by the clustered computing environment such as, for example, the steps in the methods illustrated by flowcharts 400, 600, 800, and 900 may be carried out across multiple processors located at the same or different locations.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments have been described above, it should be understood that they have been presented by way of example only, and not limitation. It will be understood by those skilled in the relevant art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments, but should be defined only in accordance with the following claims and their equivalents.

What is claimed is:

1. A computer-implemented method comprising:
receiving audio data corresponding to a user utterance;
providing the audio data to a remote speech recognizer and, in response, obtaining several search results that are identified as a result of a search of a remote database using at least a portion of a remotely-generated transcription of the user utterance as a query, the remotely-generated transcription of the user utterance being generated by the remote speech recognizer;
obtaining a locally-generated transcription of the user utterance and a speech recognition confidence value associated with the locally-generated transcription of the user utterance, the locally-generated transcription of the user utterance and the confidence value being generated by a local speech recognizer;
in response to determining that the speech recognition confidence value generated by the local speech recognizer fails to meet a threshold value:
bypassing performing a search of a local database using at least a portion of the locally-generated transcription as a query,
providing one or more of the search results that are identified as a result of the search of the remote database for output,
receiving data indicative of a selection of a particular search result from among the provided search results that are identified as a result of the search of the remote database, and
storing the locally-generated transcription of the user utterance, generated by the local speech recognizer, in association with data identifying the particular search result;
receiving, after storing the locally-generated transcription of the user utterance, second audio data corresponding to a second user utterance;
obtaining a locally-generated transcription of the second user utterance, the locally-generated transcription of the second user utterance being generated by the local speech recognizer;
determining that the locally-generated transcription of the second user utterance matches the stored locally-generated transcription of the user utterance;
providing the second audio data to the remote speech recognizer after determining that the locally-generated transcription of the second user utterance matches the stored locally-generated transcription of the user utterance and, in response, obtaining several additional search results that are identified as a result of a search of the remote database using at least a portion of a remotely-generated transcription of the second user utterance as a query, the remotely-generated transcription of the second user utterance being generated by the remote speech recognizer; and
providing the particular search result and the several additional search results that are identified as a result of the search of the remote database for output, based on the data identifying the particular search result that is stored in association with the locally-generated transcription of the user utterance.

2. The method of claim 1, further comprising:
obtaining, from the remote speech recognizer, several candidate transcriptions of the user utterance;
providing one or more of the several candidate transcriptions for output; and
receiving data indicative of a selection of a particular transcription from among the one or more candidate transcriptions,
wherein the several search results that are identified as a result of the search of the remote database are identified as a result of a search of the remote database using at least a portion of the particular transcription.

3. The method of claim 1, wherein the data identifying the particular search result includes a universal resource locator (URL).

4. The method of claim 1, wherein the data identifying the particular search result includes a web page.

5. A system comprising:
one or more computers and one or more storage devices storing instructions that are operable, when executed by the one or more computers, to cause the one or more computers to perform operations comprising:
receiving audio data corresponding to a user utterance;
providing the audio data to a remote speech recognizer and, in response, obtaining several search results that are identified as a result of a search of a remote database using at least a portion of a remotely-generated transcription of the user utterance as a query, the remotely-generated transcription of the user utterance being generated by the remote speech recognizer;
obtaining a locally-generated transcription of the user utterance and a speech recognition confidence value associated with the locally-generated transcription of the user utterance, the locally-generated transcription of the user utterance and the confidence value being generated by a local speech recognizer;
in response to determining that the speech recognition confidence value generated by the local speech recognizer fails to meet a threshold value:
bypassing performing a search of a local database using at least a portion of the locally-generated transcription as a query,
providing one or more of the search results that are identified as a result of the search of the remote database for output, receiving data indicative of a selection of a particular search result from among the provided search results that are identified as a result of the search of the remote database, and storing the locally-generated transcription of the user utterance, generated by the local speech recognizer, in association with data identifying the particular search result;

receiving, after storing the locally-generated transcription of the user utterance, second audio data corresponding to a second user utterance;

obtaining a locally-generated transcription of the second user utterance, the locally-generated transcription of the second user utterance being generated by the local speech recognizer;

determining that the locally-generated transcription of the second user utterance matches the stored locally-generated transcription of the user utterance;

providing the second audio data to the remote speech recognizer after determining that the locally-generated transcription of the second user utterance matches the stored locally-generated transcription of the user utterance and, in response, obtaining several additional search results that are identified as a result of a search of the remote database using at least a portion of a remotely-generated transcription of the second user utterance as a query, the remotely-generated transcription of the second user utterance being generated by the remote speech recognizer; and providing the particular search result and the several additional search results that are identified as a result of the search of the remote database for output, based on the data identifying the particular search result that is stored in association with the locally-generated transcription of the user utterance.

6. The system of claim 5, wherein the operations further comprise:

obtaining, from the remote speech recognizer, several candidate transcriptions of the user utterance;

providing one or more of the several candidate transcriptions for output; and receiving data indicative of a selection of a particular transcription from among the one or more candidate transcriptions, wherein the several search results that are identified as a result of the search of the remote database are identified as a result of a search of the remote database using at least a portion of the particular transcription.

7. The system of claim 5, wherein the data identifying the particular search result includes a universal resource locator (URL).

8. The system of claim 5, wherein the data identifying the particular search result includes a web page.

9. A computer-readable storage device storing software comprising instructions executable by one or more computers which, upon such execution, cause the one or more computers to perform operations comprising:

receiving audio data corresponding to a user utterance;

providing the audio data to a remote speech recognizer and, in response, obtaining several search results that are identified as a result of a search of a remote database using at least a portion of a remotely-generated transcription of the user utterance as a query, the remotely-generated transcription of the user utterance being generated by the remote speech recognizer;

obtaining a locally-generated transcription of the user utterance and a speech recognition confidence value associated with the locally-generated transcription of the user utterance, the locally-generated transcription of the user utterance and the confidence value being generated by a local speech recognizer;

in response to determining that the speech recognition confidence value generated by the local speech recognizer fails to meet a threshold value:

bypassing performing a search of a local database using at least a portion of the locally-generated transcription as a query, providing one or more of the search results that are identified as a result of the search of the remote database for output, receiving data indicative of a selection of a particular search result from among the provided search results that are identified as a result of the search of the remote database, and storing the locally-generated transcription of the user utterance, generated by the local speech recognizer, in association with data identifying the particular search result;

receiving, after storing the locally-generated transcription of the user utterance, second audio data corresponding to a second user utterance;

obtaining a locally-generated transcription of the second user utterance, the locally-generated transcription of the second user utterance being generated by the local speech recognizer;

determining that the locally-generated transcription of the second user utterance matches the stored locally-generated transcription of the user utterance;

providing the second audio data to the remote speech recognizer after determining that the locally-generated transcription of the second user utterance matches the stored locally-generated transcription of the user utterance and, in response, obtaining several additional search results that are identified as a result of a search of the remote database using at least a portion of a remotely-generated transcription of the second user utterance as a query, the remotely-generated transcription of the second user utterance being generated by the remote speech recognizer; and providing the particular search result and the several additional search results that are identified as a result of the search of the remote database for output, based on the data identifying the particular search result that is stored in association with the locally-generated transcription of the user utterance.

10. The device of claim 9, wherein the operations further comprise:

obtaining, from the remote speech recognizer, several candidate transcriptions of the user utterance;

providing one or more of the several candidate transcriptions for output; and receiving data indicative of a selection of a particular transcription from among the one or more candidate transcriptions, wherein the several search results that are identified as a result of the search of the remote database are identified as a result of a search of the remote database using at least a portion of the particular transcription.

11. The device of claim 9, wherein the data identifying the particular search result includes a universal resource locator (URL).

12. The device of claim 9, wherein the data identifying the particular search result includes a web page.

* * * * *